United States Patent Office 3,304,309
Patented Feb. 14, 1967

3,304,309
1 - SUBSTITUTED-6-ACETYL-1,2,3,4-TETRAHYDRO-
β-CARBOLINES AND PROCESS FOR THEIR PRO-
DUCTION
John Shavel, Jr., Mendham, Maximilian von Strandt-
mann, Rockaway, and Chester Puchalski, Morristown,
N.J., assignors to Warner-Lambert Pharmaceutical
Company, Morris Plains, N.J., a corporation of Dela-
ware
No Drawing. Filed Aug. 19, 1963, Ser. No. 303,143
7 Claims. (Cl. 260—296)

This invention relates to new and novel substituted β-carbolines. More particularly, this invention relates to certain 1-substituted-6-acetyl-1,2,3,4-tetrahydro-β-carbolines and to a novel process for the production of these carbolines. The compounds of this invention may be represented by the following structural formula:

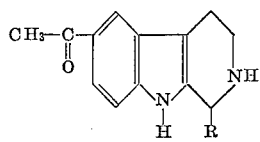

wherein R may be a lower alkyl radical such as methyl, ethyl, propyl, butyl or isobutyl, an aryl radical such as phenyl, an aralkyl radical such as

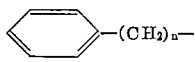

or an aralkyl radical which may be further substituted by one or more lower alkoxy groups such as

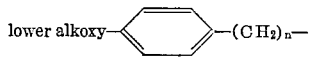

or

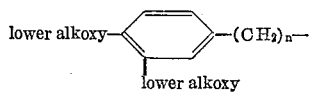

in which $n$ is an integer of from 1 to 6 and said lower alkoxy group may be methoxy, ethoxy or propoxy, for example.

This invention also includes within its scope the nontoxic acid addition salts of these novel substituted β-carbolines.

The novel compounds of this invention exhibit significant pharmacological activity and are useful in the treatment of hypertension. In addition, they are valuable starting materials for the production of other substituted β-carbolines.

In accordance with this invention, these 1-substituted β-carbolines are produced by condensing 5-acetyltryptamine with an aldehyde of the formula RCHO in which R has the same meaning as defined above. The reaction may be expressed by the following scheme:

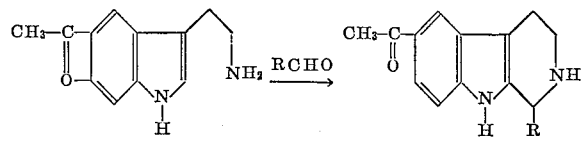

The starting material, 5-acetyltryptamine, employed in the above condensation is described and claimed in a copending application Serial No. 119,831 filed June 27, 1961, now Patent No. 3,182,071.

Generally, the above reaction is carried out by refluxing 5-acetyltryptamine hydrochloride with the selected aldehyde in a suitable solvent such as n-butanol for a period of about 3 to 20 hours. The precipitated reaction product is collected by filtration and can be purified by recrystallization.

Alternatively, condensation may be carried out by refluxing 5-acetyltryptamine free base and the selected aldehyde in an anhydrous solvent, such as dry benzene, with azeotropic removal of water and by treatment of the resulting intermediate with acid, such as a solution of hydrogen chloride in ethanol. The reaction product is then recovered and purified as described above.

Another alternate method of condensation involves addition of an acid such as aqueous 1 N sulfuric acid to a solution of 5-acetyltryptamine base and the selected aldehyde in methanol and heating the reaction mixture at a temperature range of 40° to 90° C. The resulting reaction product is then worked up as described.

The compounds of our invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid and then purifying the resulting salt by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are given in order further to illustrate the present invention. All temperatures are given in the centigrade scale.

EXAMPLE 1

*1-phenethyl-6-acetyl-1,2,3,4-tetrahydro-β-carboline hydrochloride*

A solution of 0.1 mol 5-acetyl tryptamine hydrochloride and 0.105 mol hydrocinnamaldehyde in 1400 ml. n-butanol is refluxed for 3½ to 4 hours. The reaction mixture is allowed to cool to about 20° to 30°. 1-phenethyl-6-acetyl - 1,2,3,4 - tetrahydro-β-carboline hydrochloride comes out of solution as a precipitate which is filtered off, washed with ether and purified by recrystallization from methanol. The recrystallized product has a melting point of 292° to 294°.

Analysis for $C_{21}H_{22}N_2O \cdot HCl$.—Calc.: C—71.07, H—6.53, N—7.89. Found: C—71.05, H—6.78, N—7.82.

EXAMPLE 2

*1-(3,4-dimethoxy benzyl)-6-acetyl-1,2,3,4-tetrahydro-β-carboline hydrochloride*

In a similar way as described in Example 1, (3,4-dimethoxy phenyl pyruvic acid) reacts with 5-acetyltryptamine hydrochloride to give 1-(3,4-dimethoxy benzyl)-6-acetyl-1,2,3,4-tetrahydro-β-carboline hydrochloride, melting at 275° to 277°.

Analysis for $C_{22}H_{24}N_2O_3 \cdot HCl$.—Calc.: C—65.91, H—6.28, N—6.99. Found: C—65.83, H—6.50, N—6.81.

EXAMPLE 3

*1-(p-methoxybenzyl)-6-acetyl-1,2,3,4-tetrahydro-β-carboline hydrochloride*

In a similar way as described in Example 1, p-methoxy phenyl pyruvic acid reacts with 5-acetyltryptamine hydrochloride to give 1-(p-methoxybenzyl)-6-acetyl-1,2,3,4- tetrahydro-β-carboline hydrochloride, melting at 287° to 290°.

Analysis of $C_{21}H_{22}N_2O_2 \cdot HCl$.—Calc.: C—68.01, H—6.25, N—7.55. Found: C—67.99, H—6.45, N—7.27.

EXAMPLE 4

1-benzyl-6-acetyl-1,2,3,4-tetrahydro-β-carboline hydrochloride

In a similar way as described in Example 1, phenylacetaldehyde reacts with 5-acetyltryptamine hydrochloride to give 1-benzyl-6-acetyl-1,2,3,4-tetrahydro-β-carboline hydrochloride, melting at 287° to 293°.

Analysis of $C_{20}H_{20}N_3O \cdot HCl$.—Calc.: C—70.47, H—6.21, N—8.22. Found: C—70.58, H—6.12, N—8.00.

The free base is obtained by basifying a solution of the hydrochloride and extracting the solution with chloroform followed by evaporation of the extracts and recrystallization of the residue from aqueous methanol. The base melts at 150° to 153°.

EXAMPLE 5

1-phenyl-6-acetyl-1,2,3,4-tetrahydro-β-carboline

A solution of 4.35 grams 5-acetyltryptamine and 2.3 grams benzaldehyde in 250 ml. dry benzene is refluxed for 2 hours in which period the water formed is collected in a Dean-Stark trap. The reaction mixture is filtered hot and evaporated in vacuo to dryness. The yellow residue is gently heated in 160 ml. ethanol, saturated with hydrogen chloride until complete solution. The reaction mixture is allowed to stand at room temperature for about an hour. The resulting precipitate is filtered off and dissolved in water. The aqueous solution is basified with sodium hydroxide and extracted with chloroform. The chloroform extracts are dried over sodium sulfate and evaporated in vacuo. The residue is recrystallized from ethanol to give 1-phenyl-6-acetyl-1,2,3,4-tetrahydro-β-carboline ethanolate melting at 85° to 92°. A nonsolvated product is obtained by drying at 140°/0.1 mm., M.P. 196° to 202° for 3 hours.

Analysis of $C_{19}H_{18}N_2O$.—Calc.: C—78.59, H—6.25, N—9.65. Found: C—78.36, H—6.43, N—9.40.

EXAMPLE 6

1-methyl-6-acetyl-1,2,3,4-tetrahydro-β-carboline

To a solution of 6.5 grams 5-acetyltryptamine in 50 ml. methanol, 40 ml. 1 N sulfuric acid and 250 ml. water is added 14.5 grams acetaldehyde. The reaction mixture is kept at 40° for about 180 minutes and at 90° for about 90 minutes and is then cooled, basified with ammonia and extracted with chloroform. The extracts are dried over sodium sulfate and evaporated in vacuo to give 1-methyl-6-acetyl-1,2,3,4-tetrahydro-β-carboline, melting at 194° to 196°.

Analysis of $C_{14}H_{16}N_2O$.—Calc.: C—73.65, H—7.06, N—12.27. Found: C—73.42, H—7.15, N—11.99.

It is understood that the foregoing detailed description is given merely by way of illustration and that many variations may be made therein without departing from the spirit of our invention.

Having described our invention, what we desire to secure by Letters Patent is:

1. A compound of the formula:

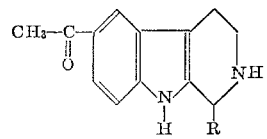

wherein R is a member selected from the group consisting of lower alkyl, aryl, aralkyl and lower alkoxy substituted aralkyl and to the nontoxic pharmaceutically acceptable acid addition salts thereof.

2. 1-methyl-6-acetyl-1,2,3,4-tetrahydro-β-carboline.
3. 1-phenyl-6-acetyl-1,2,3,4-tetrahydro-β-carboline.
4. 1-benzyl-6-acetyl-1,2,3,4-tetrahydro-β-carboline.
5. 1-p-methoxybenzyl-6-acetyl - 1,2,3,4 - tetrahydro-β-carboline.
6. 1-(3,4 - dimethoxy)benzyl-6-acetyl - 1,2,3,4 - tetrahydro-β-carboline.
7. 1-phenylethyl - 6 - acetyl-1,2,3,4-tetrahydro-β-carboline.

References Cited by the Examiner
UNITED STATES PATENTS

| | | | |
|---|---|---|---|
| 2,642,438 | 6/1953 | Duschinsky | 260—296 |
| 3,071,589 | 6/1959 | Archer | 260—296 |

WALTER A. MODANCE, *Primary Examiner.*

ALAN L. ROTMAN, *Assistant Examiner.*